US006321936B1

(12) United States Patent
Feltrin

(10) Patent No.: US 6,321,936 B1
(45) Date of Patent: Nov. 27, 2001

(54) DEVICE FOR RELEASING STACKED PRODUCTS IN A VENDING MACHINE

(75) Inventor: Antonio Feltrin, Castelletto Monferrato (IT)

(73) Assignee: Vendo Italy S.p.A., Coniolo (IT)

( * ) Notice: Subject to any disclaimer, the term of this patent is extended or adjusted under 35 U.S.C. 154(b) by 0 days.

(21) Appl. No.: 09/450,107

(22) Filed: Nov. 29, 1999

(30) Foreign Application Priority Data

Dec. 2, 1998 (EP) .............................................. 98830723

(51) Int. Cl.[7] ............................................ B65G 59/00
(52) U.S. Cl. .......................................... 221/251; 221/289
(58) Field of Search ............................ 221/12, 92, 116, 221/123, 131, 112, 247, 248, 251, 289

(56) References Cited

U.S. PATENT DOCUMENTS 3,158,289 * 11/1964 Van Brunt ........................... 221/116
3,165,231 * 1/1965 Heiser ................................. 221/115

FOREIGN PATENT DOCUMENTS 0237628 9/1987 (EP) .

* cited by examiner

*Primary Examiner*—Kenneth W. Noland
(74) *Attorney, Agent, or Firm*—Akin, Gump, Strauss, Hauer & Feld, L.L.P.

(57) ABSTRACT

A device in a vending machine for releasing products arranged in a stack made up of horizontal rows each including a plurality of products includes a containing structure (1, 2, 3, 4) inside which there are positioned the members (5, 6, 7) for selecting and releasing the products while the controlling and driving components are positioned outside, the selecting and releasing members including a plurality of doors (7) longitudinally aligned along the drop channel and means suitable to perform a sequential opening of said doors (7) and a subsequent closing thereof. This sequential opening allows to use the machine for dispensing different products without requiring a manual adjustment of the mechanical members which retain the products.

9 Claims, 3 Drawing Sheets

DEVICE FOR RELEASING STACKED PRODUCTS IN A VENDING MACHINE

The present invention relates to the mechanisms included in vending machines, and in particular to a device for releasing products arranged in a stack within the machine.

It is known that vending machines for products packed in envelopes having the shape of a surface of revolution, such as typically cans and bottles of drinks, usually include a basket located below the stack of products and suitable to control the release thereof The release is carried out through a rotation of the basket, e.g. counter-clockwise, which moves to a vertical position whereby the products rolls down from the left side. Since the basket always occupies a portion of the width of the product drop channel, even when it reaches the vertical position, the maximum product diameter which can be managed by said device depends on the distance from the channel wall to the edge of the basket in the vertical position. Therefore, the width of the drop channel is not completely exploited in this way.

An improved and simplified device which overcomes said drawback is disclosed in EP 757 827 granted to the same applicant.

Furthermore, in order to exploit the depth of the device, not only a single product at a time but a whole row of products horizontally aligned one behind the other comes down into the basket. The sequential release of the products making up said row (usually 2 or 3) is achieved by providing a series of horizontal projections of increasing width on the wall of the drop channel along the depth of the device. By carrying out the above-mentioned rotation of the basket in more steps, at each stop there is only one product which has sufficient room, between the basket edge and the projection positioned by that product, to roll out of the basket and thus be released, whereas those behind it in the row are retained by the respective wider projections. Once the drop channel width is established, the limit to the number of products making up a row is given by the fact that the widest projection must not be wider than the basket in the vertical position, otherwise said projection would excessively reduce the drop width.

A further drawback of using such projections for managing the drop sequence of the products aligned in a row comes out when the machine is used alternately for different products. For the sake of example, a same row of products could include four 33 cl cans or two 50 cl bottles. Therefore while in the first case four projections of increasing width will be provided, in the second case the projections will be two only and probably of different width with respect to the first case.

As a consequence, upon re-supplying of the machine with a product different from the previous one it will be necessary to change manually the number and/or arrangement of the retaining projections. Moreover it is also necessary to change, through a suitable switch, the setting of the number of stops of the basket according to the number of products making up the row. This obviously implies an increase in labour, a greater complexity of the machine and a poor flexibility in the use thereof Therefore, the object of the present invention is to provide a device which overcomes the above-mentioned drawbacks.

This object is achieved by means of a device having the characteristics cited in claim 1. Other advantageous characteristics are disclosed in the depending claims.

A first fundamental advantage of the present device is that it can be used for dispensing different products without requiring the manual adaptation of the mechanical elements which retain the products. This clearly results in a reduction of labour and a greater flexibility of use of the vending machine.

A further advantage which can be obtained through a particular embodiment of the present device is its capability of self-adjustment according to the type of products to be dispensed, whereby the operator's intervention is merely limited to the re-supplying.

These and other advantages and characteristics of the device according to the present invention will be apparent to those skilled in the art from the following detailed description of an embodiment thereof referring to the annexed drawings wherein.

Figure 1:
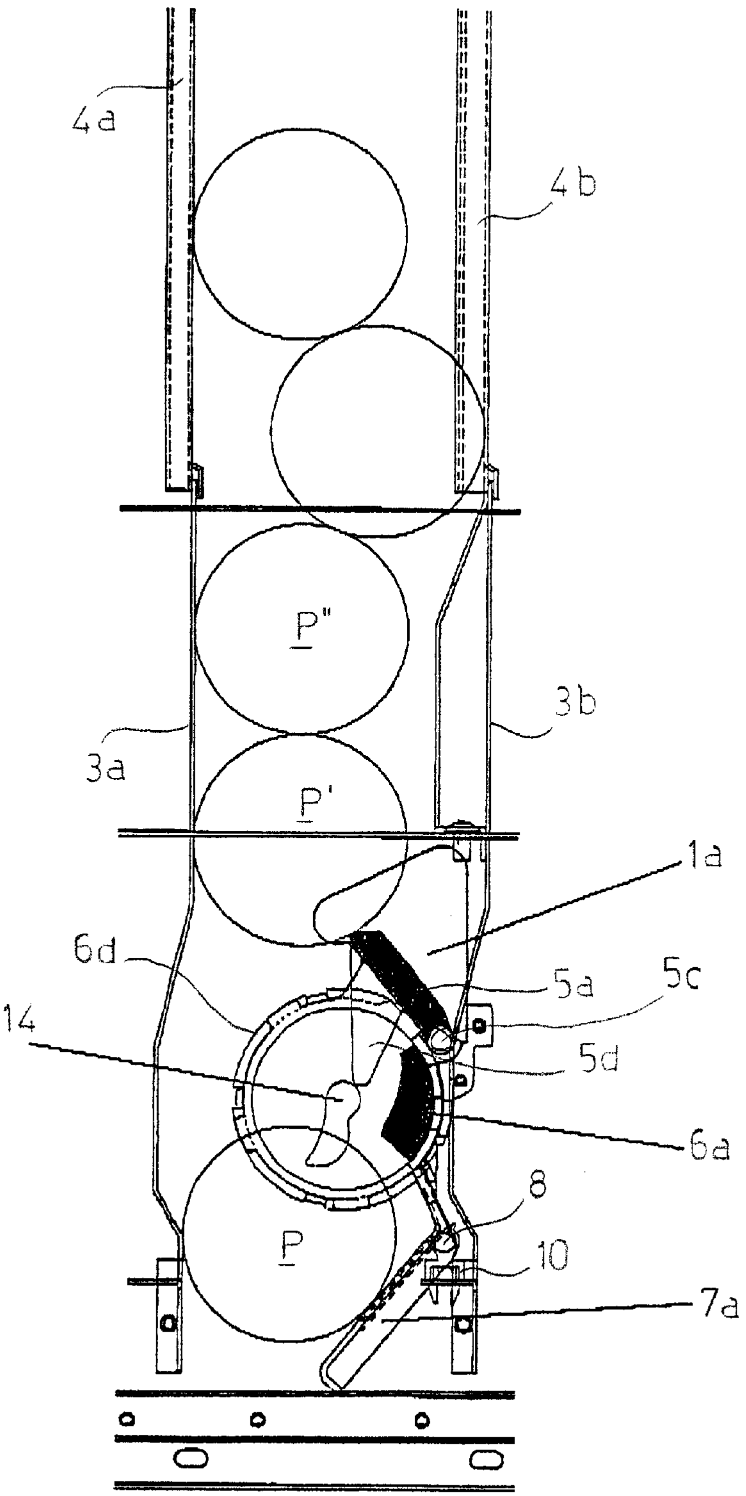
FIG. 1 is a diagrammatic front view showing the main members of the present device.
Figure 7:
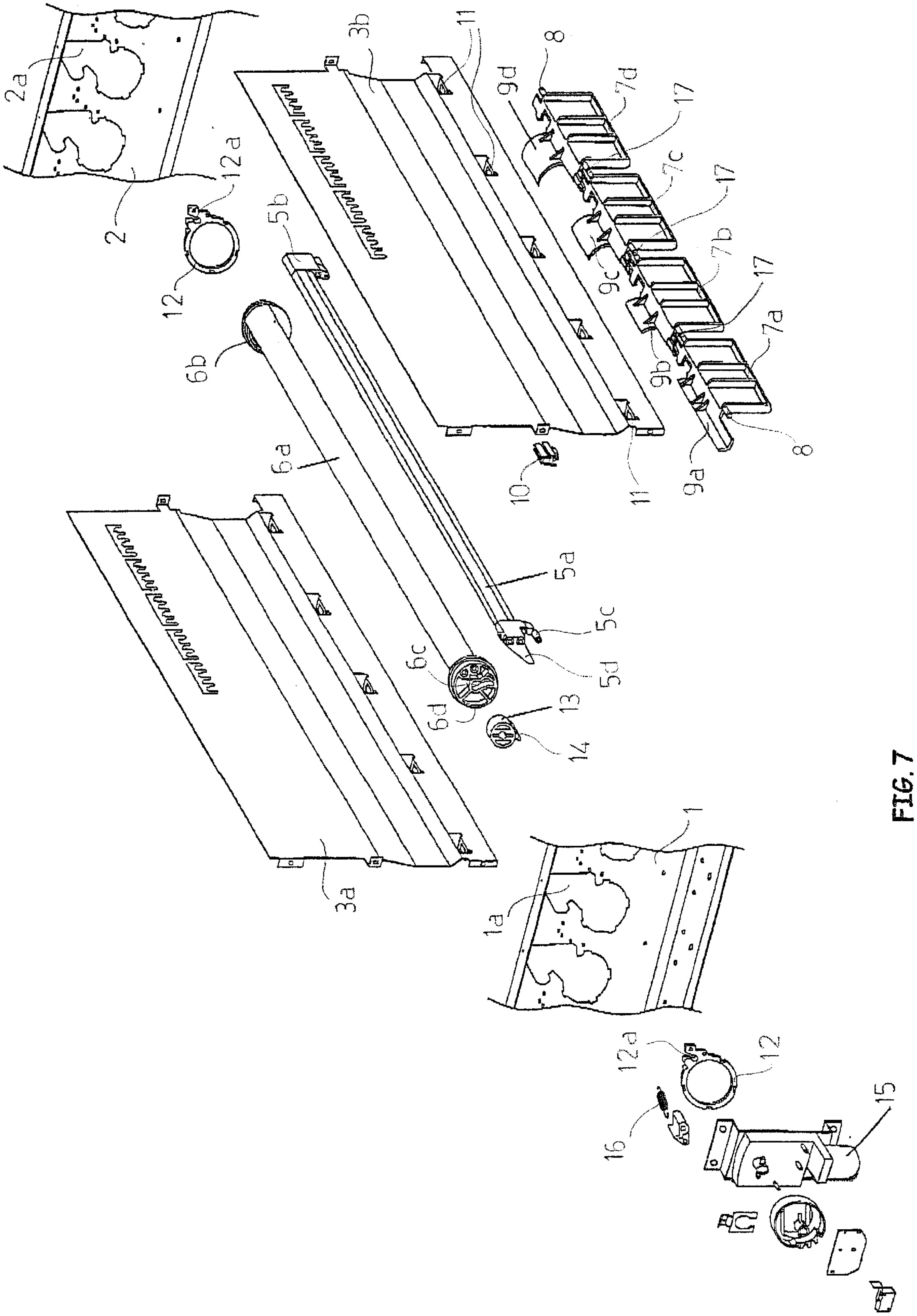
FIG. 7 is a perspective exploded view showing the members which make up said device.

Referring first to FIGS. 1 and 7, there is seen that a device according to the present invention conventionally includes a structure for containing the products on sale, inside which structure the members for selecting and releasing the products are positioned, while the components for controlling and driving said members are placed outside.

The containing structure is made up of a front plate 1 and a rear plate 2, mutually connected by a left flank **3*a* and a right flank 3*b*. Along the upper edge of said flanks 3*a*, 3*b*, two side walls 4*a*, 4*b* (seen in FIGS. 1 to 6**) are positioned to contain the stacked products.

The members for selecting and releasing the products consist in a rocker lever 5, an underlying revolving basket 6, as well as a series of novel aligned doors 7 which are substantially L-shaped though with an angle greater than 90° between the two sides. In particular, in the illustrated embodiment there are provided four doors **7*a*, 7*b*, 7*c*, 7*d* each of them having horizontal side pins 8 and a respective projection 9*a*, 9*b*, 9*c*, 9*d* along the longitudinal edge of the upper short side. These projections extend towards the inside of the device with an internal radius equal to the external radius of the revolving basket 6, and with an angular extension increasing from the first projection 9*a* to the fourth projection 9*d*. The pins 8 of each door 7 are engaged in respective inserts 10 (only one shown in FIG. 7) which are in turn received in corresponding seats 11 formed on the inner side of flank 3*b***.

The lever 5 and the basket 6 are made up of respective sections **5*a*, 6*a* provided, at the front and rear, with terminals 5*b*, 6*b* which go across the plates 1 and 2 through corresponding shaped passage holes 1*a* and 2*a***.

The components for controlling and driving the above members include supporting rings 12, mounted at said holes **1*a* and 2*a*, wherein the terminals 6*b* are fitted so as to rotatably support the basket 6. A cylindrical body 13 has on its rear side a relief cam 14, whose substantially "comma-shaped" profile corresponds to the profile of a respective seat 6*c* formed on the front side of the front terminal 6*b* of the basket 6. It should be noted that the depth of the cam 14 is such that it projects from the seat 6*c*, and a similar relief cam is integrally formed on the rear terminal 6*b*. The body 13 also has, on its front side, a seat for the connection to an output shaft of a motor-reducer 15** which provides the device with the rotation, counter-clockwise in the illustrated example.

The rocker lever 5 is supported and controlled through its specularly symmetrical terminals **5*b*. In particular, each terminal 5***b* has a lower horizontal pin 5*c* suitable to engage a corresponding seat 12*a* formed in the upper right quadrant of the respective supporting ring 12. Furthermore, on the inner side facing the basket 6 there is provided a triangular projection 5*d* acting as a follower engaged with the cam 14, under the action of a transverse biasing spring 16 secured to the front terminal 5*b*.

In the preferred embodiment shown in the figures, the front terminal 6*b* is also provided with a peripheral portion 6*d*, preceding the section 6*a* in the direction of rotation, along which there is formed a rear longitudinal extension of 5–10 mm (not visible in the figure) having an outer radius equal to the outer radius of the section 6*a*. This longitudinal extension is intended to engage the projection 9*a* of the first door 7*a*, which projection extends forward of the respective rotation pin 8 in the longitudinal direction. Furthermore, the four doors 7 are mutually connected through three joints 17 which allow the independent rotation thereof during the sequential opening but restrain them to a common closing. In other words, the four doors 7 can open independently one after the other (7*a*, 7*b*, 7*c*and then 7*d*), but upon closure of the first door 7*a* also the other three doors are closed. The object of this arrangement will be made clear further on with reference to the operating sequence of the present device.

From the description above, it is clear how the activation of the motor-reducer 15 by the control unit (not shown) causes the rotation of the body 13 and of the cam 14 integral therewith, and consequently also of the revolving basket 6 with which the cam 14 is engaged through the seat 6*c* so as to act like a connecting key.

The releasing sequence of a row of products in the stack is now illustrated with reference to FIGS. 2 to 6, wherein for the sake of clarity the positions of the sections 5*a* and 6*a* are indicated by the corresponding filled profiles.

Figure 2:
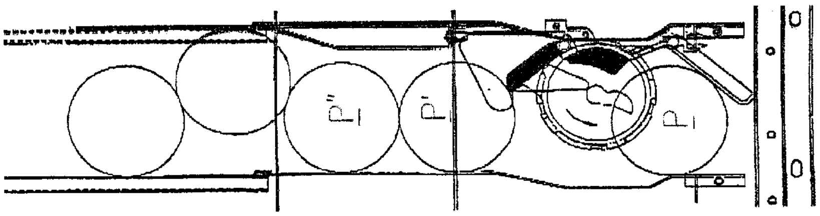

The sequence starts from FIG. 2, which reproduces FIG. 1 on a reduced scale. In this state the lower row P of products is retained by the doors 7, which are in turn kept in the closed position by the section 6*a* of the basket 6 on which the projections 9 abut. In this way, the weight of the products which would tend to rotate the doors 7 around the respective pins 8 is counteracted by the reaction provided by the basket 6 on the projections 9. The overlying stack of the other rows of products P', P", etc. is supported at the bottom by the section 5*a* of the lever 5, which at its ends abuts on the left side of the profile of the passage holes 1*a* and 2*a*.

Figure 3:
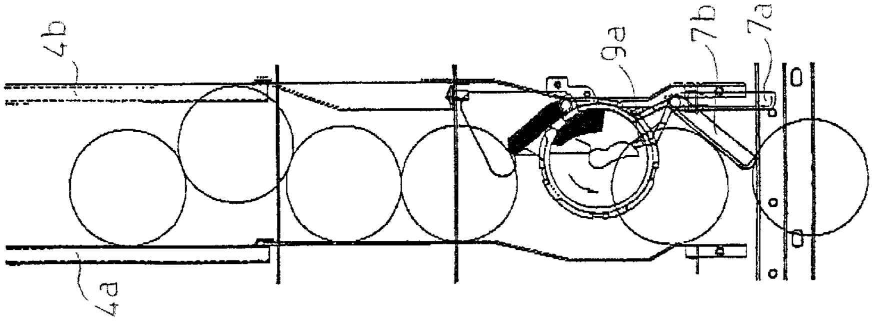

After a little counter-clockwise rotation of the basket 6, the condition of FIG. 3 is reached wherein the trailing edge of the section 6*a* has gone beyond the projection 9*a* of the first door 7*a*. As a consequence, the door 7*a* which is no more retained by the basket 6 opens under the weight of the first product in the row, which falls on an underlying chute which conveys it to the outlet where it is made available to the buyer. In this condition, the other three products in the row are still retained by the respective doors 7*b*, 7*c*and 7*d*. Assuming that the row is rather made up of two products only, it is clear that the release of the first product will require the opening of the first two doors 7*a*, 7*b* and therefore a greater rotation of the basket 6. Considering therefore a row of n products, each partial rotation of the basket 6 will disengage a number of doors 7 (one or more) equal to 1/n of the overall length of the product drop channel.

Figure 4:
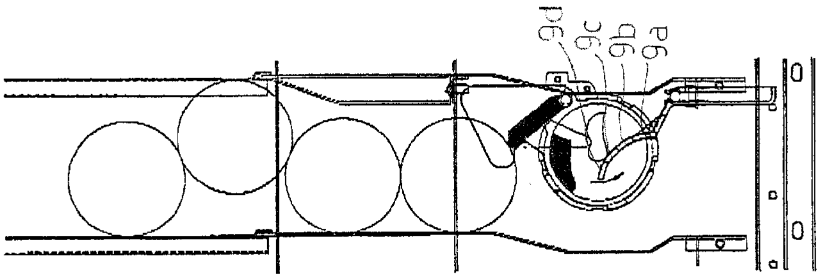

Whatever the number n of products is, proceeding with the counter-clockwise rotation of the basket 6 there is reached the condition shown in FIG. 4 where all the doors 7 are open. As seen in said figure, the projections 9 extend into the central portion of the drop channel, while the cam 14 has reached a horizontal position and is about to raise the lever 5 through the follower 5*d*. At this point it is preferable, though not strictly necessary, to adopt the previously illustrated arrangement for the anticipated closure of the doors 7.

In fact, the raising of the lever 5 causes the fall of the stack of products onto the underlying basket 6 with the bottom row P' abutting on the section 6*a*. While proceeding in its rotation, the basket 6 slowly lowers the stack that at a certain moment would rest on the projections 9 still located in the center of the drop channel. As a consequence, when the basket 6 would reach said projections 9 to act on them so as to close the doors 7, it would be necessary to overcome the stack weight and to lift it slightly in order to rotate clockwise the doors to the closed position of FIG. 2. This would involve not only a greater work for the motor-reducer 15, but also a significant stress on the structure of the doors 7, the pins 8 and the projections 9.

In order to prevent this difficulty, the peripheral portion 6*d* provided with the longitudinal extension acts on the projection 9*a* in advance with respect to the section 6*a*. In this way, thanks to the connection achieved through the above-illustrated joints 17, in the position of FIG. 5 all the doors 7 have already reached their closed position, while the section 6*a* is only about halfway of the rotation and is lowering the bottom row P' of the stack. The cam 14 has reached a vertical position and, after having raised and kept raised the lever 5 to allow the descent of a new row of products, is now about to allow the return thereof under the action of the biasing spring 16.

Figure 6:
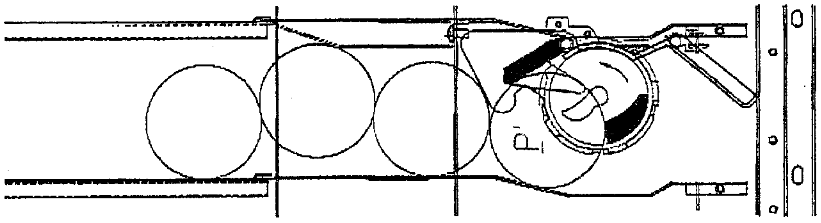
FIGS. 2 to 6 are views similar to the preceding one and showing the operating sequence of said device.

This latter situation is illustrated in FIG. 6, wherein the lever 5 abuts on the bottom row P' of the stack and is about to rest on the profile of the passage hole 1*a*, 2*a*. From this point, the rotation of the basket 6 continues until the row P' is lowered onto the closed doors 7 thus returning to the starting situation of FIG. 2.

From the description above it is clear how the device according to the present invention achieves the object of allowing a change in the number of products of the stack rows, without requiring any manual adjustment of the retaining means for the sequential release of the products which make up a row. The further object of not even requiring the manual setting of the number of stops of the basket 6 is achievable by adding a drop sensor not shown in the figures.

Such a drop sensor is connected to the control unit so that the motor-reducer 15 is switched off as soon as the sensor detects that a product was dropped from the stack. This control function can be carried out, for example, by a piezoelectric sensor applied to the conveying chute and suitable to detect the impact of the product on the chute. Another possibility is to provide a sensor, or better a series of sensors, suitable to detect the passage of the product between the drop channel and the chute by means of photoelectric cells, proximity sensors, flexible plates connected to microswitches and the like.

Figure 5:
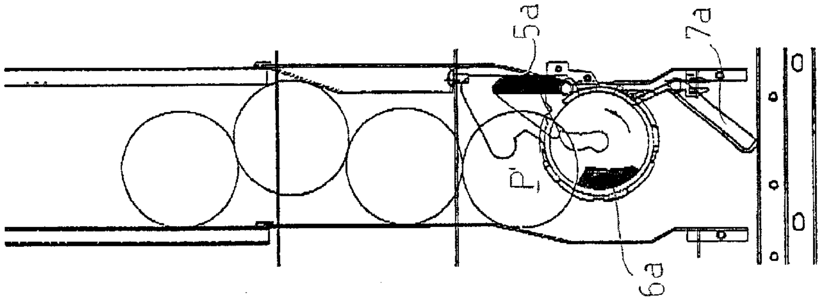

The addition of this drop sensor enables the device to self-adjust according to the number of products which make up a row, after a first "learning" cycle. In other words, the control unit detects the length of the interval between the sale request and the product drop, said interval being short if the rotation of the basket 6 is short whereas it becomes long when the basket 6 has to complete the rotation (FIGS. 4 to 6). Therefore, when the unit detects an interval much longer than the previous intervals this means that a row has been completed and the product which has just been dropped is the first of the subsequent row. The number of products in a row is therefore equal to the number of short intervals, and in the following cycles the unit is able to set the stops of the basket 6 even independently of the drop sensor.

It is clear that the description above can be applied with the proper changes to a symmetrical device wherein the doors 7 are pivoted on the left side and the basket 6 therefore rotates clockwise. Similarly, the motor-reducer 15 may be located on the rear and the opening sequence of the doors 7 may be reversed by reversing the direction of increase of the projections 9.

It should also be noted that though in the embodiments above the opening and closing of the doors 7 are automatically caused by the rotation of the basket 6, it would also be possible to control the doors 7 autonomously. In other words, the doors 7 would not have the projections 9 and would rather be controlled by other mechanisms, while the basket 6 would be used only for controlling the descent of the stack. The doors could also operate differently, for example being provided with a horizontal motion in a directions transverse with respect to the drop channel. In any case, there would still remain the essential feature of the sequential opening of the doors, which always allows to change the number of products in a row without requiring manual adjustments.

Therefore it is clear that the above-described and illustrated embodiment of the device according to the invention is just an example susceptible of various modifications. In particular, the number, shape and arrangement of the doors 7 can be somewhat changed according to the specific needs, and also other members such as the lever 5 and the basket 6 may be replaced by other mechanically equivalent members.

What is claimed is:

1. A device in a vending machine for releasing products arranged in a plurality of horizontal rows, each horizontal row including a plurality of products, each product having a base end and a top end, the products in each horizontal row being stacked end to end and arranged in a plurality of vertical columns longitudinally aligned along a drop channel, said device including a structure for containing each of said horizontal rows and vertical columns comprising a front plate and a rear plate to which two flanks and two walls are secured so as to define a drop channel at a bottom, members for selecting and releasing the products being positioned inside said structure while components for controlling and driving said members for selecting and releasing are positioned outside of the structure, characterized in that the members for selecting and releasing include a plurality of doors longitudinally aligned along the drop channel and mobile between a closed position wherein the doors prevent the drop of the products and an open position wherein the doors allow the drop of the products, as well as means suitable to sequentially open and close the doors.

2. The device according to claim 1, characterized in that the members for selecting and releasing include a rocker lever suitable to support a horizontal row and a plurality of vertical columns of products and a revolving basket suitable to receive a single horizontal row of products released from said rocker lever and accompany the single horizontal row onto the closed doors.

3. The device according to claim 2, characterized in that the opening and closing of the doors is controlled by the revolving basket.

4. The device according to claim 3, characterized in that the revolving basket is made up of a section provided at each end with circular terminals and the doors are substantially L-shaped with horizontal side pins and respective projections along a longitudinal edge of an upper short side, said projections extending toward an inside of the device with an internal radius equal to an external radius of said section and with an angular extension increasing from the projection of a first door to the projection of a last door.

5. The device according to claim 4, characterized in that a terminal of the basket is provided with a peripheral portion preceding the section in a direction of rotation along which there is formed a longitudinal extension towards an inside of the basket and having an outer radius equal to the external radius of the section, the projection of the first door adjacent said terminal extends forward of a rotation pin in the longitudinal direction, the doors are mutually connected through joints which allow independent opening thereof, one after the other, but upon closure of the first door transmit the closing motion to all of the doors.

6. The device according to claim 1, wherein the components for controlling and driving the members for selecting and releasing include a motor-reducer and a control unit suitable to control an operation of the device, said components further include at least one sensor suitable to detect a drop of the products and functionally connected to said control unit so as to control a deactivation of said motor-reducer when said sensor detects that a product has been dropped from one of the doors onto an underlying conveying chute.

7. The device according to claim 6, characterized in that said sensor is a piezoelectric sensor applied to the conveying chute and suitable to detect an impact of a released product onto said chute.

8. The device according to claim 6, wherein one or more sensors suitable to detect a passage of the released product between the drop channel and the conveying chute is comprised of at least one of photoelectric cells, proximity sensors and flexible plates connected to microswitches.

9. The device according to claim 6, characterized in that the control unit includes a timer suitable to detect an interval between a sale request and an arrival of a signal from the drop sensor, as well as a processor suitable to process a length of said interval to obtain a number of products which make up a single horizontal row and to accordingly set a position and number of stops of the members for selecting and releasing the products.

* * * * *